Sept. 29, 1953        G. L. HIGGINS        2,653,595
HOLE-CUTTING DEVICE
Filed April 14, 1952        2 Sheets-Sheet 2
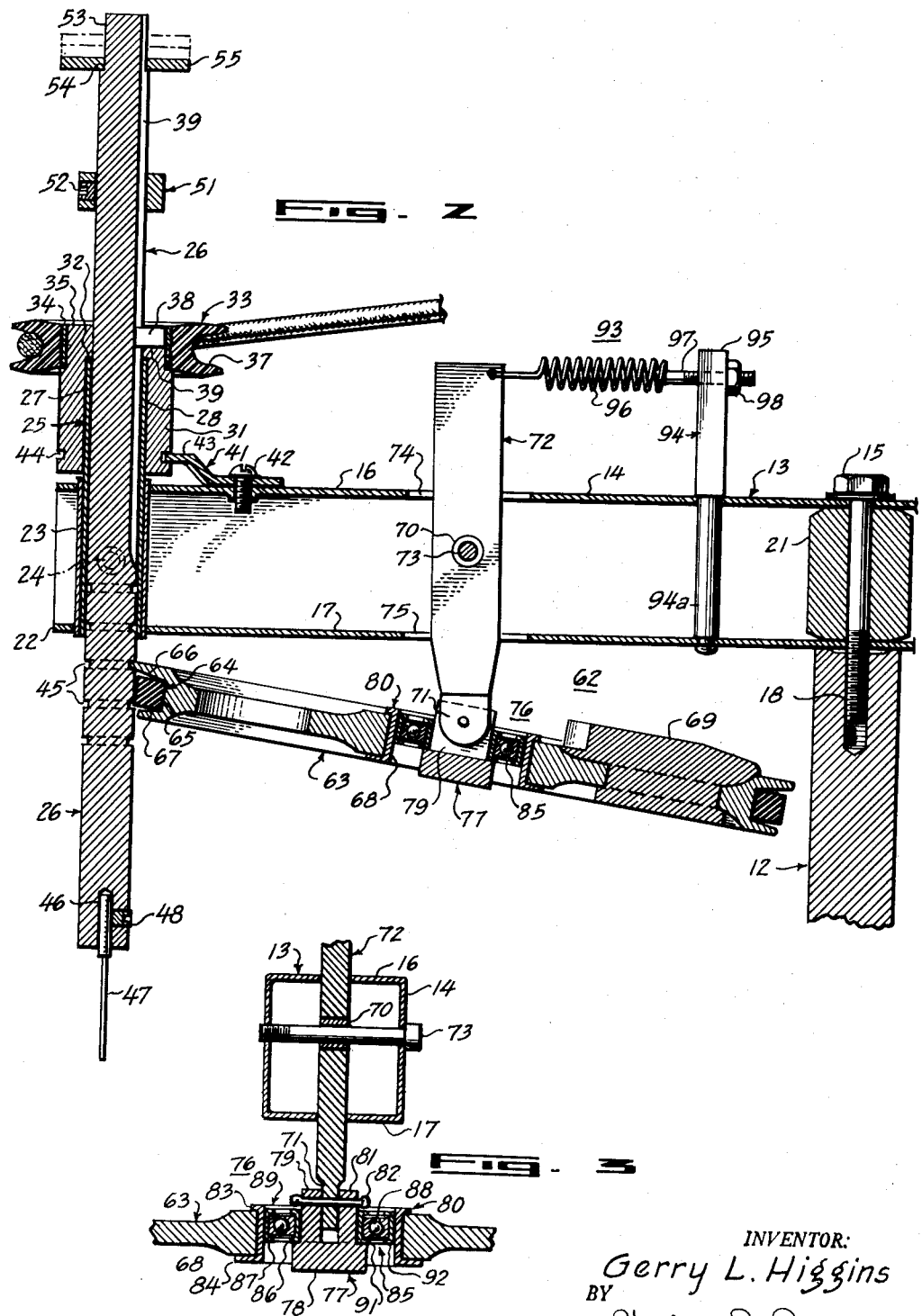
INVENTOR:
Gerry L. Higgins
BY
ATTORNEY Patented Sept. 29, 1953

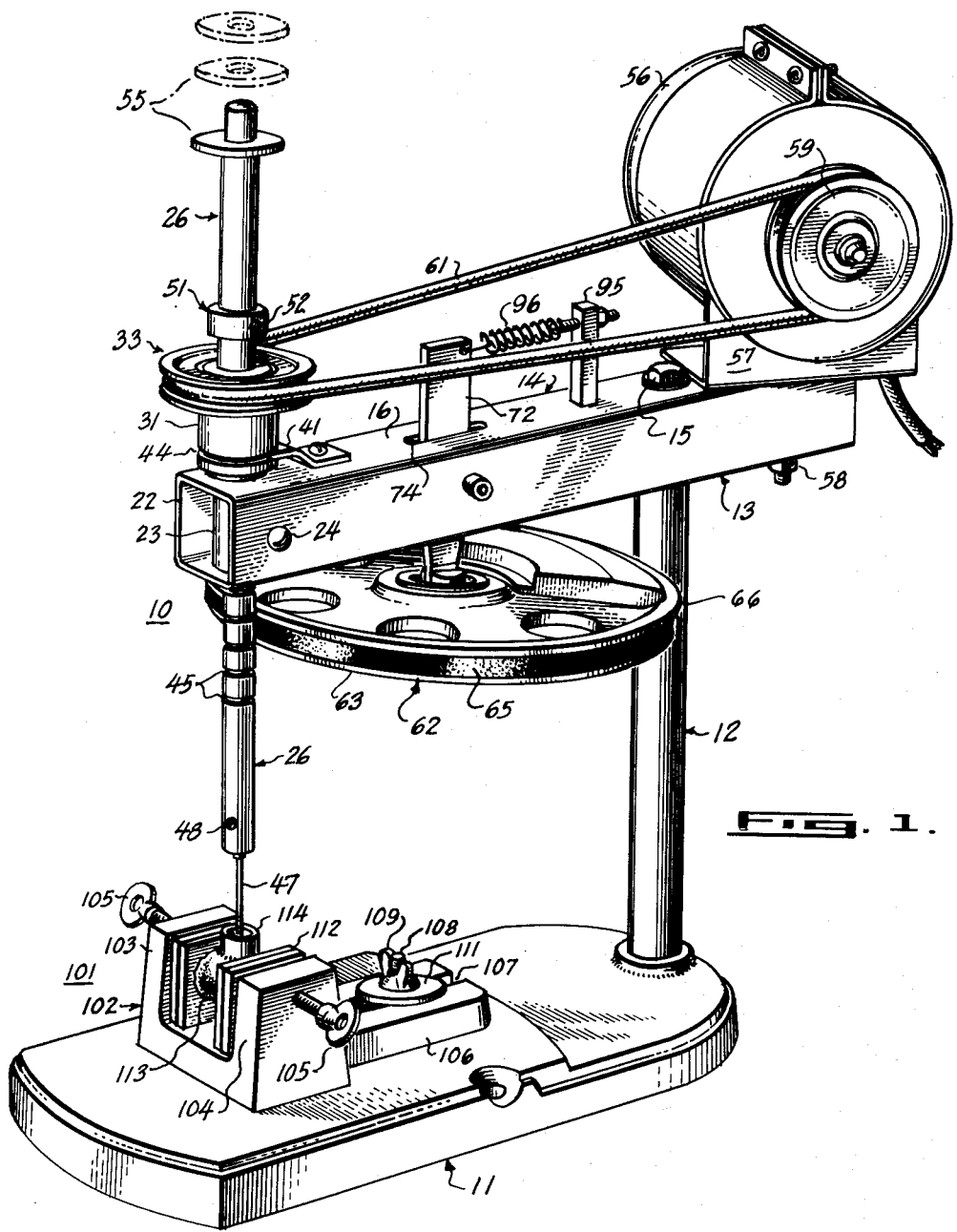

2,653,595

UNITED STATES PATENT OFFICE 2,653,595

HOLE-CUTTING DEVICE

Gerry L. Higgins, San Diego, Calif.

Application April 14, 1952, Serial No. 282,122

18 Claims. (Cl. 125—30)

1

This invention relates to hole-forming tools and more particularly to a drilling device for cutting holes in precious stones, glass, and like materials.

An object of the present invention is to provide an improved form of drilling apparatus having a unique and effective construction permitting accurate forming of holes in gems without breakage thereof or other injury thereto.

Another object of the invention is the provision of a gem drilling device having a reciprocable drive spindle supported and driven in novel manner.

Another object of the invention resides in providing in an improved gem drilling device a unique actuating assembly for affording reciprocating movement to its rotatably mounted drive spindle.

A further object of the invention is to provide in a gem drilling device a rotative drive spindle in operative association with a novel actuating wheel which effects reciprocatory movement of the holder and having means operative on the holder for readily adjusting the amount of rectilinear movement thereof.

A still further object of the invention resides in the provision of a gem drilling device having relatively few parts, which is inexpensive to construct and which is extremely efficient and accurate in operation.

Other objects and features of this invention will be readily apparent to those skilled in the art from the following specification and appended drawings illustrating certain preferred embodiments in which:

Figure 1 is a perspective view of a gem drilling device in accordance with the present invention.

Figure 2 is a sectional view showing the mounting for the drive spindle and further illustrating the drive member for effecting reciprocatory movement of the spindle.

Figure 3 is a sectional view showing a detail.

The drawings illustrate a drilling device constructed in accordance with the present invention, this device is designated therein generally by the numeral 10. Drilling device 10 includes a base 11 and a standard 12 suitably fixedly secured at its lower end to base 11 adjacent the rear edge thereof. A support arm 13 formed of an elongated, square shaped in cross-section tubular member 14 is detachably secured intermediate its ends to the upper end of standard 12 by a bolt 15. Bolt 15 is adapted to pass through aligned openings provided in the upper and lower walls 16 and 17 of tubular member 14 and to be

2 threaded into a suitable opening 18 provided in the upper end of standard 12. A spacer block 21 is afforded within tubular member 14 to maintain the walls apart and is bored to receive the shank of bolt 15. Bolt 15 serves to clamp support arm 13 in any desired position relative to base 11.

Support arm 13 adjacent its extremity 22 carries a vertical bearing member 23 which is maintained in position on arm 13 by a screw 24 having its end forced against the exterior wall surface of bearing 23. Journaled within bearing 23 is a guide sleeve 25 which slidably receives a drive spindle 26. Guide sleeve 25 is of greater length than bearing 23 and when rotatively positioned therein is adapted to project a portion 27 of its length above the top wall of tubular member 14. The projected portion 27 extends into bore 28 of a cylindrical member 31 and abuts against an annular interior shoulder 32 provided within bore 28. A rigid connection is effected between guide sleeve 25 and cylindrical member 31 by securing portion 27 of the former within bore 28 of the latter as by a drive fit. Rigidly affixed to the exterior of drive cylinder 31 is a centrally bored drive pulley 33, the body of which may be formed of pressed plastic composition, such as "Micarta," or any other suitable molded resin-impregnated material. A metallic mounting band 34 whose exterior surface is serrated is secured within the bore of pulley 33 and is press-fitted over a reduced portion 35 of drive cylinder 31 to affix pulley 33 thereto. Drive pulley 33 and its associated elements are adapted to be fitted about drive spindle 26 and, as will be described, permit rectilinear movement of the spindle 26 relative thereto. A peripheral groove 37 is provided on pulley 33 to receive a drive belt for rotation of the pulley. A drive connection is effected between pulley 33 and drive spindle 26 by a detent or key member 38 suitably affixed within a slot in reduced portion 35 and projecting radially into a longitudinal groove 39 formed in drive spindle 26. By reason of this connection rotative movement of pulley 33 is transmitted to spindle 26. Detent or key 38 prevents free rotative movement of spindle 26 relative to pulley 33 but does not restrict axial movement thereof relative to the pulley. The particular construction, mounting, and material of the pulley means form no part of the present invention. The invention requires only that a pulley be provided through which rotative movement of the spindle 26 can be effected in unison with the pulley and which will not restrain the spindle against longitudinal movement.

Drive pulley 33 and its cylinder 31 are located and maintained in desired operative position on the top wall 16 of support arm 13 by a generally Z-shaped bracket 41 which is affixed to top wall 16 by a screw 42 and which has a leg 43 which slidably projects into a circumferential groove 44 cut into the exterior wall of cylinder 31. Leg 43 in cooperation with groove 44 positions and maintains the drive mechanism for spindle 26 as required yet permits such mechanism to be rotated to obtain the desired rotation of spindle 26.

Drive spindle 26, as best shown in Figure 2, is of elongated, generally cylindrical form having the slot 39 therein for affording a slidable drive connection between spindle 26 and pulley 33. Slot 39 extends from the upper end of spindle 26 for more than half the length thereof. On the lower portion of elongated spindle 26 is provided a series of inclined peripheral grooves 45 for a purpose to be described. The lower end of drive spindle 26 is recessed as at 46 for receiving a suitable hole forming tool 47. A set screw 48 is provided for securing such tool in place. An annular stop member 51 having an associated set screw 52 is positioned and clamped upon spindle 26, spaced from the upper end thereof and adapted to be engaged by the upper surface of pulley 33 on downward rectilinear movement of the spindle 26 to limit the extent of such downward movement. It is apparent that stop member 51 may be adjustably positioned upon spindle 26 to vary the extent of its downward movement. The upper end of the spindle 26 is cut away as at 53 to provide a reduced portion and an annular shoulder 54 upon which may be disposed washers 55 for a purpose to be hereinafter explained.

A usual electric motor 56 is positioned upon support arm 13 at the end thereof opposite that carrying the spindle 26 and its drive mechanism, being held thereon by a mounting bracket 57 and suitable fastening means 58. A pulley 59 is affixed to the shaft of motor 56 and a belt 61 interconnects motor pulley 59 and spindle actuating pulley 33 to obtain rotation of the latter to effect the desired rotative movement of spindle 26 on operation of motor 56.

The manner of effecting rotative movement of spindle 26 has been described and now a description will be provided of the means for producing reciprocal or rectilinear movement of the spindle to enable it to perform a hole-cutting operation. This means is indicated generally in the drawings by the numeral 62. As shown in the drawings this means 62 comprises a wheel element 63 having a peripheral groove 64 within which is disposed a friction ring 65 formed of rubber or other suitable material having a friction characteristic. It is noted that the spaced annular walls 66 and 67 which define groove 64 are not of the same height, the upper annular wall 66 being of greater length to permit it to project within any selected groove 45 on spindle 26. Ring 65 is adapted to lie in frictional engagement with the outer surface of spindle 26. The purpose of this construction will be hereinafter fully described.

Wheel 63 is centrally bored as at 68 and carries a weight 69 upon its upper surface, positioned at one side of bore 68. Wheel 63 is rotatively and rockably supported at the lower end 71 of an elongated member 72, which member 72 itself is pivotally mounted upon support arm 13 by a pin 73 passed through the side walls of the support arm 13 and generally centrally through the elongated member 72. Pin 73 extends through a bearing 70 carried by member 72 to afford ready pivotal movement thereof. Elongated member 72 projects through aligned slots 74 and 75 provided in the upper and lower walls 16 and 17 of support arm 13. Slots 74 and 75 are of sufficient size to allow elongated member 72 to pivot on its supporting pin 73. The mounting for wheel 63 is best illustrated in Figures 2 and 3 and is designated therein generally by the numeral 76. Mounting 76 comprises a connecting member 77 of generally U-shape having a base portion 78 and two upstanding spaced leg portions 79 and 81 between which is inserted the lower end 71 of elongated member 72. A pin 82 pivotally interconnects end 71 to leg portions 79 and 81 for a purpose to be described. A mounting sleeve 80 is fitted within bore 68 of wheel 63 against the wall surfaces of the bore and with its upper and lower annular edges being outwardly bent as at 83 and 84 to embrace therebetween a portion of the wheel 63 thereby to affix sleeve 80 to wheel 63. U-shaped connecting member 77 is adapted to be positioned within bore 68 of wheel 63 and the wheel is rotatably connected thereto by means of an anti-friction bearing assembly 85. Bearing assembly 85 is of usual construction comprising inner and outer races 86 and 87, interposed balls 88 and a housing 89 composed of inner and outer flanged mounting rings 91 and 92. The rings 91 and 92 operatively connect the ball bearing assembly 85 respectively to leg portions 79 and 81 of the U-shaped member 77 and to the sleeve 80 of wheel 63, the rings being held in place as by a drive fit, soldering, brazing or by any other usual fastening device.

With the mounting construction above described wheel 63 is adapted to rotate freely about the lower end 71 of elongated member 72 as a center and is further adapted to have a rocking, tilting, or seesaw movement about the pin 82 as a center. By reason of the interfitting of the lower end 71 of member 72 between legs 79 and 81 of U-shape member 77 this to and fro movement of wheel 63 is confined to one plane, the plane of the elongated member 72. There is no sidewise movement transverse to this plane.

As was stated hereinabove, the upper annular wall 66 which defines groove 64 on wheel 63 is adapted to be projected into a groove 45 on drive spindle 26 and the friction ring 65 is adapted to be pressed against the surface of spindle 26. To maintain wall 66 within a groove 45 and friction ring 65 in operative position there is provided a biasing assembly indicated generally in the drawings by the numeral 93. This biasing assembly 93 is carried upon support arm 13 and comprises an upright member 94 whose lower end 94a is suitably affixed as shown to bottom wall 17 of support arm 13 and whose upper end 95 is spaced above the top wall 16 of arm 13. A tension spring 96 is connected at one of its ends to the upper end of elongate member 72 and at its other end to a bolt 97 mounted at the upper end 95 of upright member 94. A nut 98 carried on the threaded end of bolt 97 affords a means of adjusting the resilient force applied by spring 96 to elongate member 72. This force biases elongate member 72 for clockwise movement, as viewed in the drawings, about its pivot pin 73. This tends to carry the lower end 71 of elongate member 72 in the direction of spindle 26. This obviously carries wheel 63 which is mounted on end 71 also toward spindle 26, so that, when the end of its wall or rim 66 is manually fitted within a groove 45 on spindle 26 the resilient force of spring 96 will act to maintain it releasably therein and to maintain friction ring 65 in operative position against spindle 26. Projection of the end of wall 66 into a groove 45 serves to hold the spindle 26 spaced above the base 11. The particular spacing afforded spindle 26 is determined by the position of the particular groove 45 engaged by the end of wall 66. The end of wall 66 can be readily shifted into cooperation with any desired groove 45 by manually moving wheel 63, against the bias of spring 96, away from spindle 26 and then manually inserting it into the desired groove where it will be retained by the force of spring 96.

Positioned on the base 11 is a work-holding assembly 101 comprising a generally H-shaped bracket 102 with two projecting legs 103 and 104, each of which carries a bolt 105, and a portion 106 slotted from its upper end as at 107 for the passage of a bolt 108 carried by the base 11. A wing nut 109 and washer 111 cooperate with bolt 108 to adjustably secure bracket 102 upon base 11. Clamping pads 112 are provided in the space between legs 103 and 104 and are actuable by bolts 105 to grasp and hold a gem, indicated by the numeral 113, or other material to be worked, therebetween. Since support arm 13 is adjustably secured to standard 12 by bolt 15 and work-holding bracket 102 is adjustably mounted on base 11 the hole-cutting tool 47 carried at the lower end of spindle 26 and the gem 113 can be moved or adjusted relative to each other until they are in the desired position for the hole-forming operation.

As shown in Figure 1 a fitting 114 is affixed upon gem 113 by means of a suitable wax at the position at which a hole is to be formed. The fitting 114 is of ring-form and is filled with a cutting compound such as silicon carbide. The hole-cutting tool 47 acts upon and applies pressure to this cutting compound to form the desired hole through the gem.

Hole-cutting tool 47 is provided with a rotating and a longitudinal or reciprocal movement during the cutting operation through the agencies of the pulley 33 and the wheel 63. It is readily apparent that as spindle 26 is caused to rotate by the motor and the pulleys 33 and 59 a rotative movement is transmitted to wheel 63 by reason of the engagement of the end of wall 66 of wheel 63 with the wall surfaces of groove 45 and the frictional engagement of ring 65 with the exterior surface of spindle 26. This rotative movement of wheel 63 will carry weight 69 toward and away from spindle 26 thereby to effect a rocking or seesaw movement of wheel 63 about its pivotal connection at the lower end of elongate member 72. This seesaw movement of wheel 63 will be transmitted to spindle 26 by reason of its engagement therewith to afford a reciprocal movement to the spindle 26, and to the hole-forming tool 47 to enable the latter to bring pressure to bear upon the gem to be worked. The extent of travel of spindle 26 in its rectilinear movements and the amount of force exerted by tool 47 is dependent upon the amount of to and fro movement of wheel 63 about pin 82, and this amount of rocking movement of wheel 63 is dependent first on the size of the weight 69 provided on wheel 63. The user of the present device will select a weighted wheel which will afford him such reciprocal movements and pressures as are best suited for his purposes. The amount of rectilinear travel provided the spindle 26 and the pressure applied by tool 47 can be varied by the placing of weights in the form of washers 55 upon the annular shoulder 54 at the upper end of spindle 26 to counteract the effect of the weight 69 on wheel 63. The spindle 26 will have its greatest travel and the force with which cutting tool 47 acts upon a gem will be greatest when there is no counteracting weight upon the spindle 26. The amount of force that may be applied to a gem is determined by its inherent ability to withstand blows and obviously only so much force will be used as will not result in breaking or shattering of the gem. Washers 55 will be applied to spindle 26 in the amount necessary to counteract the force of weight 69 on wheel 63 to reduce the force applied to a safe quantity. It has been determined that only very short movements of spindle 26 and a slight pressure of cutting tool 47 are needed to permit cutting tool 47 to act with the cutting compound to form a desired opening in the gem. These conditions are readily obtainable by a prudent selection of washers for support on spindle 26. Of course it is understood that a gem may be selected which will not react unfavorably to high pressure and therefore the full travel of spindle 26 could be utilized and no washers need be positioned on spindle 26. The stop member 51 positioned on spindle 26 limits the total downward movement that the spindle 26 may achieve. It is adjusted upon the spindle 26 at a position which will prevent cutting tool 47 from forming an opening completely through the gem being worked. The cutting tool 47 will be permitted to extend into and form an opening therein which stops short of the lower surface of the gem, this in order to prevent the cutting tool 47 from suddenly breaking through the lower surface and cause chipping or fracturing about the mouth of the lower opening. The hole-forming operation may then be completed by reversing the gem within its mounting bracket or preferably by adjusting the amount of force that is applied by the cutting tool 47 upon the gem. To change the pressure exerted by the end of cutting tool 47 in the hole-forming operation it is necessary merely to apply a washer or washers 55 on the end of spindle 26 to counteract the amount of force that wheel 63 may apply to spindle 26.

It is obvious that the device above described may be used on a variety of materials for forming holes therein. The cutting tool may be in the form of a drill or other cutting instrument with a pointed end. Further the work need not be held on any specific type of mount such as mounting assembly 102.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. In a device of the character described, a rotatably supported drive member, a hole-forming tool mounted thereon, means for rotating said drive member, a rotary member having a frictional engagement with said drive member whereby rotative movement of the latter effects rotative movement of the former, a mounting rotatively supporting said rotary member, means for pivotally supporting said mounting, and means for moving said mounting back and forth upon its pivotal supporting means to provide a rocking movement to said rotary member for reciprocating said drive member.

2. In a hole-forming device, a rotatable drive member for mounting a hole-cutting tool, a rotatably supported wheel positioned for peripheral engagement with said drive member, a pivoted mounting for said wheel, and means carried by said wheel for reciprocating said pivoted mounting to provide a rocking movement to said wheel for reciprocating said drive member.

3. In a hole-forming device, a rotatably supported drive member, a cutting tool mounted thereon, actuating means for rotating said drive member, a wheel positioned for frictional engagement at its periphery with said drive member whereby rotative movement of the latter effects rotative movement of the former, means for rotatably mounting said wheel, means for supporting said mounting means for pivotal movement, and means carried by said wheel for moving said mounting means back and forth upon its pivotal supporting means to provide a rocking movement to said wheel for reciprocating said drive member.

4. A hole-forming device comprising a rotatable drive member for mounting a hole-cutting tool, a wheel, means rotatively supporting said wheel, friction means carried by said wheel engageable with said drive member whereby said drive member and said wheel are made to rotate in unison, means for pivotally mounting said means which rotatively supports said wheel, and means carried by said wheel for reciprocating said means which rotatively supports said wheel upon its pivotal mounting to provide a rocking movement to said wheel for reciprocating said drive member.

5. A hole-forming device comprising a rotatably supported drive member, a cutting tool mounted thereon, actuation means for rotating said drive member, a wheel, means for rotatively supporting said wheel, friction means carried by said wheel, tension means for biasing said wheel in the direction of said drive member to engage said friction means with said drive member whereby rotative movement of the latter effects rotative movement of the former, means for pivotally mounting said means which rotatively supports said wheel, and means carried by said wheel operative on rotation of said wheel to reciprocate said means which rotatively supports the wheel upon its pivotal mounting rock said wheel to effect reciprocatory movement of said drive member.

6. In a hole-forming device, a rotatable elongated drive member for mounting a hole-cutting tool, said drive member having a plurality of transverse grooves therein, a wheel, an annular peripheral projection on said wheel insertable within a groove on said drive member, a pivoted mounting for said wheel, and means carried by said wheel for reciprocating said pivoted mounting to provide a rocking movement to said wheel for reciprocating said drive member.

7. A drilling device comprising an elongated drive member supported for rotative movement, a cutting tool carried by said drive member, a plurality of transverse grooves on said drive member, a wheel, an annular peripheral projection on said wheel, means for rotatively supporting said wheel, friction means carried upon the periphery of said wheel, tension means for biasing said wheel in the direction of the drive member to maintain said peripheral projection within a groove on said drive member and to engage said friction means with said drive member whereby said drive member and said wheel are made to rotate in unison, means for pivotally mounting said means which rotatively supports said wheel, and means carried by said wheel operative on rotation of said wheel to reciprocate said means which rotatively supports the wheel upon its pivotal mounting to rock said wheel to effect reciprocatory movement of said drive member.

8. In a hole-forming device, a rotatable drive member for mounting a hole-cutting tool, a rotatably supported wheel positioned for peripheral engagement with said drive member, a pivoted mounting for said wheel, means carried by said wheel for reciprocating said pivoted mounting to provide a rocking movement to said wheel for reciprocating said drive member, and means adapted to be carried by said drive member for limiting the extent of reciprocating movement thereof.

9. A hole-forming device comprising a rotatable drive member for mounting a hole-cutting tool, a wheel, means rotatively supporting said wheel, friction means carried by said wheel engageable with said drive member whereby said drive member and said wheel are made to rotate in unison, means for pivotally mounting said means which rotatively supports said wheel, means carried by said wheel for reciprocating said means which rotatively supports said wheel upon its pivotal mounting to provide a rocking movement to said wheel for reciprocating said drive member, and means adapted to be carried by said drive member for limiting the extent of reciprocating movement thereof.

10. A drilling device comprising an elongated drive member supported for rotative movement, a cutting tool carried by said drive member, a plurality of transverse grooves on said drive member, a wheel, an annular peripheral projection on said wheel, means for rotatively supporting said wheel, friction means carried upon the periphery of said wheel, tension means for biasing said wheel in the direction of the drive member to maintain said peripheral projection within a groove on said drive member and to engage said friction means with said drive member whereby said drive member and said wheel are made to rotate in unison, means for pivotally mounting said means which rotatively supports said wheel, means carried by said wheel operative on rotation of said wheel to reciprocate said means which rotatively supports the wheel upon its pivotal mounting to rock said wheel to effect reciprocatory movement of said drive member, and means supportable on said drive member for limiting the extent of reciprocating movement thereof.

11. A hole-forming device comprising a standard, a support arm mounted on said standard, an elongated drive member rotatively carried by said support arm, actuating means mounted on said support arm for rotating said drive member, a wheel, means on said support arm for positioning said wheel for peripheral engagement with said drive member, said means comprising means for rotatively supporting said wheel and means for pivotally mounting the last mentioned means, and means for moving said means which rotatively supports the wheel back and forth on its pivotal mounting to provide a rocking movement to said rotary member for reciprocating said drive member.

12. A hole-cutting device comprising a standard, a support arm mounted on said standard, an elongated drive spindle rotatively and rectilinearly supported on said support arm, a cutting tool carried on said drive spindle, actuating means carried by said support arm for rotating said drive spindle, said actuating means comprising a rotatable drive pulley mounted on said drive spindle having a key and slot connection therewith, a wheel, a mounting member carried by said support arm, means for rotatively supporting said wheel, a pivotal connection between said mounting member and said last mentioned means, means providing a peripheral engagement between said wheel and said drive spindle, and means carried by said wheel for reciprocating its rotative support means about said pivotal connection on rotative movement of said wheel to provide a rocking movement to said wheel for reciprocating said drive spindle.

13. A hole-cutting device comprising a standard, a support arm mounted on said standard, an elongated drive spindle rotatively and rectilinearly supported on said support arm, a cutting tool carried by said drive spindle, actuating means carried by said support arm for rotating said drive spindle, said actuating means comprising a rotatable drive pulley mounted on said drive spindle having a key and slot connection therewith, a wheel, a mounting member carried by said support arm, means for rotatively supporting said wheel, a pivotal connection between said mounting member and said last mentioned means, means providing a peripheral engagement between said wheel and said drive spindle, said means comprising a groove on said drive spindle, a peripheral projection on said wheel receivable within said groove, and a friction means on said wheel, and means carried by said wheel for reciprocating its rotative support means about said pivotal connection on rotative movement of said wheel to provide a rocking movement to said wheel for reciprocating said drive spindle.

14. A hole-cutting device comprising a standard, a support arm mounted on said standard, an elongated drive spindle rotatively and rectilinearly supported on said support arm, a cutting tool carried by said drive spindle, actuating means carried by said support arm for rotating said drive spindle, said actuating means comprising a rotatable drive pulley mounted on said drive spindle having a key and slot connection therewith, a wheel, a mounting member carried by said support arm, means for rotatively supporting said wheel, a pivotal connection between said mounting member and said last mentioned means, means providing a peripheral engagement between said wheel and said drive spindle, said means comprising a groove on said drive spindle, a peripheral projection on said wheel receivable within said groove, and a friction means on said wheel, tension means operative on said mounting member for biasing said wheel bodily in the direction of said drive spindle to maintain said peripheral engagement between said wheel and said drive spindle, and means carried by said wheel for reciprocating its rotative support means about said pivotal connection on rotative movement of said wheel to provide a rocking movement to said wheel for reciprocating said drive spindle.

15. A hole-cutting device comprising a standard, a support arm mounted on said standard, an elongated drive spindle rotatively and rectilinearly positioned on said support arm, a cutting tool carried on said drive spindle, said elongated drive member having a longitudinal groove therein and a plurality of peripheral grooves, actuating means carried by said support arm for rotating said drive spindle, said actuating means comprising a rotatable drive pulley positioned on said elongated drive member having a key member receivable by said longitudinal groove, a wheel, a mounting member carried by said support arm, means for rotatively supporting said wheel, a pivotal connection between said mounting member and said last mentioned means, a peripheral projection on said wheel receivable within one of said peripheral grooves on said drive spindle, friction means on said wheel engageable with said drive spindle whereby said wheel and said drive pulley rotate in unison, and means carried by said wheel for reciprocating the rotative support means therefor about said pivotal connection on rotative movement of said wheel to provide a rocking movement to said wheel for reciprocating said drive spindle.

16. A hole-cutting device comprising a standard, a support arm mounted on said standard, an elongated drive spindle rotatively and rectilinearly positioned on said support arm, a cutting tool carried by said drive spindle, said elongated drive member having a longitudinal groove therein and a plurality of peripheral grooves, actuating means carried by said support arm for rotating said drive spindle, said actuating means comprising a rotatable drive pulley positioned on said elongated drive member having a key member receivable by said longitudinal groove, a wheel, a mounting member carried by said support arm, means for rotatively supporting said wheel, a pivotal connection between said mounting member and said last mentioned means, a peripheral projection on said wheel receivable within one of said peripheral grooves on said drive spindle, friction means on said wheel engageable with said drive spindle whereby said wheel and said drive spindle rotate in unison, means operative on said mounting member for biasing said wheel bodily in the direction of said drive spindle to maintain said peripheral projection within a groove and maintain said friction means in engagement with said drive spindle, and means carried by said wheel for reciprocating the rotative support means therefor about said pivotal connection on rotative movement of said wheel to provide a rocking movement to said wheel for reciprocating said drive spindle.

17. A hole-cutting device comprising a standard, a support arm mounted on said standard, an elongated drive spindle rotatively and rectilinearly supported on said support arm, a cutting tool carried by said drive spindle, actuating means carried by said support arm for rotating said drive spindle, said actuating means comprising a rotatable drive pulley mounted on said drive spindle having a key and slot connection therewith, a wheel, a mounting member carried by said support arm, means for rotatively supporting said wheel, a pivotal connection between said mounting member and said last mentioned means, means providing a peripheral engagement between said wheel and said drive spindle, said means comprising a groove on said drive spindle, a peripheral projection on said wheel receivable within said groove, and a friction means on said wheel, tension means operative on said mounting member for biasing said wheel bodily in the direction of said drive spindle to maintain said peripheral engagement between said wheel and said drive spindle, means carried by said wheel for reciprocating its rotative support means about said pivotal connection on rotative movement of said wheel to provide a rocking movement to said wheel for reciprocating said drive spindle, and means carried by said drive spindle for limiting the extent of reciprocable movement of said drive spindle.

18. A hole-cutting device comprising a standard, a support arm mounted on said standard, an elongated drive spindle rotatively and rectilinearly positioned on said support arm, a cutting tool carried by said drive spindle, said elongated drive member having a longitudinal groove therein and a plurality of peripheral grooves, actuating means carried by said support arm for rotating said drive spindle, said actuating means comprising a rotatable drive pulley positioned on said elongated drive member having a key member receivable by said longitudinal groove, a wheel, a mounting member carried by said support arm, means for rotatively supporting said wheel, a pivotal connection between said mounting member and said last mentioned means, a peripheral projection on said wheel receivable within one of said peripheral grooves on said drive spindle, friction means on said wheel engageable with said drive spindle whereby said wheel and said drive spindle rotate in unison, means operative on said mounting member for biasing said wheel bodily in the direction of said drive spindle to maintain said peripheral projection within a groove and maintain said friction means in engagement with said drive spindle, means carried by said wheel for reciprocating the rotative support means therefore about said pivotal connection on rotative movement of said wheel to provide a rocking movement to said wheel for reciprocating said drive spindle, and means carried by said drive spindle for limiting the extent of reciprocable movement of said drive spindle.

GERRY L. HIGGINS.

References Cited in the file of this patent

UNITED STATES PATENTS

| Number | Name | Date |
|---|---|---|
| 463,973 | Palmer | Nov. 24, 1891 |
| 1,295,359 | Olson | Feb. 25, 1919 |
| 1,902,055 | Beste | Mar. 21, 1933 |
| 2,372,088 | Kaveny | Mar. 20, 1945 |
| 2,549,263 | Thompson | Apr. 17, 1951 |